US011011910B2

(12) United States Patent
Chazottes

(10) Patent No.: US 11,011,910 B2
(45) Date of Patent: May 18, 2021

(54) SYSTEM AND METHOD FOR CONTROLLING A POWER STORAGE DEVICE

(71) Applicant: Electricite de France, Paris (FR)

(72) Inventor: Benoit Chazottes, Gif S/Yvette (FR)

(73) Assignee: Electricite de France

( * ) Notice: Subject to any disclaimer, the term of this patent is extended or adjusted under 35 U.S.C. 154(b) by 263 days.

(21) Appl. No.: 16/063,870

(22) PCT Filed: Dec. 21, 2016

(86) PCT No.: PCT/EP2016/082165
§ 371 (c)(1),
(2) Date: Jun. 19, 2018

(87) PCT Pub. No.: WO2017/108942
PCT Pub. Date: Jun. 29, 2017

(65) Prior Publication Data
US 2020/0014209 A1      Jan. 9, 2020

(30) Foreign Application Priority Data
Dec. 21, 2015   (FR) ...................................... 1562982

(51) Int. Cl.
*H02J 3/32*       (2006.01)
*H02J 7/00*       (2006.01)
(Continued)

(52) U.S. Cl.
CPC .............. *H02J 3/32* (2013.01); *H02J 7/0013* (2013.01); *H02J 7/35* (2013.01); *H02J 3/003* (2020.01)

(58) Field of Classification Search
CPC ...... H02J 3/32; H02J 3/003; H02J 7/00; H02J 7/35; H02J 7/0013; H02J 2003/003
(Continued)

(56) References Cited

U.S. PATENT DOCUMENTS

2006/0276938 A1* 12/2006 Miller .................... G05B 15/02
                                                                    700/295
2007/0007822 A1*  1/2007 Cioaca ................ H02J 7/00038
                                                                        307/29
(Continued)

FOREIGN PATENT DOCUMENTS

EP            2928721 A1     10/2015
WO      2011105580 A1      9/2011
WO      2014087092 A1      6/2014

OTHER PUBLICATIONS

French Search Report for Application No. FR1562982 dated Apr. 14, 2016, 2 pages.
(Continued)

*Primary Examiner* — Richard Isla
*Assistant Examiner* — Dung V Bui
(74) *Attorney, Agent, or Firm* — Lerner, David, Littenberg, Krumholz & Mentlik, LLP

(57) ABSTRACT

The present invention relates to a local control system (6) configured to define a charge or discharge command made to a power storage device (5) on the basis of a charge or discharge instruction, sent by an overall control system (7), and the instantaneous power used by the power-using devices (4), such that the instantaneous power used by the power using devices (4) is always greater than the discharge power of the power storage device (5), so as to guarantee that the power stored by the power storage device (5) is not re-injected into the power distribution network (3).

20 Claims, 2 Drawing Sheets

(51) Int. Cl.
*H02J 7/35* (2006.01)
*H02J 3/00* (2006.01)

(58) Field of Classification Search
USPC .......................................................... 320/128
See application file for complete search history.

(56) References Cited

U.S. PATENT DOCUMENTS

| | | | | |
|---|---|---|---|---|
| 2010/0007209 A1* | 1/2010 | Eppler | ................... | H02J 7/345 307/36 |
| 2010/0235008 A1* | 9/2010 | Forbes, Jr. | ............. | B60L 53/14 700/291 |
| 2011/0148202 A1* | 6/2011 | Rada | ........................ | G05F 1/70 307/52 |
| 2013/0113413 A1 | 5/2013 | Harty | | |
| 2013/0217409 A1* | 8/2013 | Bridges | ................ | B60L 11/184 455/456.1 |
| 2014/0277788 A1* | 9/2014 | Forbes, Jr. | ............. | G05B 15/02 700/286 |
| 2014/0379151 A1 | 12/2014 | Tokuda et al. | | |
| 2015/0153394 A1* | 6/2015 | Carlson | ............. | G01R 21/1331 700/291 |
| 2015/0241896 A1* | 8/2015 | Nishibayashi | ......... | G05B 15/02 700/286 |
| 2015/0261239 A1* | 9/2015 | Zhang | ................... | G06Q 30/08 700/291 |
| 2016/0006245 A1* | 1/2016 | Chow | ...................... | H02J 3/14 700/291 |

OTHER PUBLICATIONS

International Search Report for Application No. PCT/EP2016/082165 dated Feb. 13, 2017, 2 pages.

\* cited by examiner

SYSTEM AND METHOD FOR CONTROLLING A POWER STORAGE DEVICE

CROSS REFERENCE TO RELATED APPLICATIONS

The present application is a national phase entry under 35 U.S.C. § 371 of International Application No. PCT/EP2016/082165, filed Dec. 21, 2016, which claims priority from French Patent Application No. 1562982 filed Dec. 21, 2015, all of which are hereby incorporated herein by reference.

FIELD OF THE INVENTION

The present invention relates to the field of optimisation of consumption in a power distribution network.

PRIOR ART

Control systems of a power storage device of a consumer terminal are known, such as that described in document EP 2928721 A1, wherein each battery comprises a local control system configured to set up bidirectional communication with an overall control system.

For each battery the overall control system determines an optimal charge profile, as a function of the overall electrical consumption profile possible over the power distribution network resulting from individual choices of charge profile specific to each battery sent out iteratively by each local control system to the overall control system.

However, such control systems of a power storage device of a consumer terminal do not consider the fact that some of the consumer terminals comprise a local power production system.

Also, control systems of a power storage device of a consumer terminal are known, such as that described in document US 20140379151, which provide that some of the consumer terminals comprise a local power production system.

However, such control systems for charge and discharge of a power storage device of a consumer terminal do not limit the power to be reinjected into the distribution network.

Yet, the consumer terminal is not always permitted to reinject power into the network, in particular when the consumer terminal is not a contractual producer of power or when the consumer terminal consumes less power than it produces.

Also, the power issue of the discharge of the battery reinjected into the network is not counted by local meter production and cannot be remunerated as a local production would be. The consumer terminal therefore has no interest in reinjecting power stored by the power storage device into the distribution network.

SUMMARY OF THE INVENTION

An aim of the invention is to provide a control system of a local power storage system (in particular a domestic battery) capable of controlling the charge and discharge of the local power storage system to allow modulation of electricity consumption of the consumer terminal, and ensuring non-injection of power stored by the power storage device into the distribution network.

This aim is achieved in terms of the present invention by way of a local control system of the charge and discharge of a power storage device of a consumer terminal supplied by a power distribution network, the consumer terminal comprising:
consumer equipment;
a local power production system;
a power storage device;
the local control system comprising:
a sender configured to collect information comprising at least the charge status of the power storage device, and the instantaneous power consumed by the consumer equipment;
a sender configured to receive from an overall control system a charge or discharge instruction of the power storage device;
the local control system being characterized in that it is configured to define a charge or discharge command to the power storage device as a function of:
the charge or discharge instruction sent by the overall control system, and
the instantaneous power consumed by the consumer equipment, such that the instantaneous power consumed by the consumer equipment is always greater than the discharge power of the power storage device, to ensure non-reinjection of power stored by the power storage device into the power distribution network.

The invention prevents reinjection of electricity into the distribution network in the event where the consumer terminal is not permitted to produce power, in particular when the consumer terminal is not a producer of contractual power or when the consumer terminal consumes less power than it produces.

The invention also adapts the charge or discharge instruction of local control systems as a function of the amount of power supplied by the set of consumer terminals connected to the distribution network.

The invention adapts power consumption to the power production of a set of consumers as a function of the amount of power supplied by the set of consumer terminals connected to the distribution network.

The invention especially manages storage of power in case of fluctuating or intermittent power production (typically in the case of consumer terminals producing photovoltaic or wind power).

Also, a consumer terminal is fitted with a circuit-breaker configured to disconnect the consumer terminal from the distribution network when the power drawn from the distribution network is greater than a value of maximum subscribed contractual power.

During charging of the battery, if the sum of the power consumed by a consumer terminal exceeds power threshold corresponding to the maximum subscribed contractual power, the consumer terminal can be disconnected from the distribution network.

During charging of the battery, there is therefore a risk that the consumer terminal is automatically disconnected from the distribution network.

The instantaneous power consumed by the consumer terminal is the sum of the instantaneous power consumed by the consumer equipment and of the charge or discharge power of the power storage device.

The charge power is positive whenever the battery is charging and negative whenever the battery is discharging.

The invention is advantageously completed by the following characteristics, taken individually or in any one of their technically possible combinations.

The charge or discharge command is adjusted periodically, the charge or discharge command at a cycle N+1 being equal to the charge or discharge command at a cycle N, when at cycle N, the instantaneous power injected into the network by the consumer terminal, defined as the difference between the discharge power of the power storage device and the instantaneous power consumed by the consumer equipment, was negative or nil;

the charge or discharge command of a cycle N+1 being equal to the charge or discharge command of a cycle N minus the instantaneous power injected into the network by the consumer terminal at cycle N, when at cycle N the instantaneous power injected into the network by the consumer terminal was positive.

The charge or discharge command to the power storage device is defined such that the instantaneous power produced by the local production system is always less than or equal to the sum of the instantaneous power consumed by the consumer equipment and of the charge or discharge power of the power storage device to ensure non-reinjection of power over the power distribution network.

The charge or discharge command to the power storage device is defined such that the sum of the instantaneous power consumed by the consumer equipment and of the charge or discharge power of the power storage device is always less than or equal to a value of maximum contractual power.

Such a system prevents the consumer terminal from being disconnected from the distribution network during charging of the battery.

The local control system also comprises a user interface configured to display information comprising at least the level of charge of the storage device.

The local control system also comprises a power meter consumed by the consumer terminal.

The local control system comprises also a power meter produced by the local power production system.

The charge or discharge instruction sent by the overall control system is a function of a sunlight forecast.

The charge or discharge instruction sent by the overall control system is a function of forecasting of overall consumption of the set of consumer terminals.

The invention also proposes an overall control system of charge and discharge of a plurality of power storage devices for consumer terminals supplied by the same power distribution network some of the consumer terminals comprising:
a local power production system;
a power storage device;
a local control system of the power storage device;
the overall control system being configured to:
define as a function of information received from the different local control systems a charge or discharge instruction for at least one local control system; and
transmit said instruction to the local control system.

The invention also proposes a control process of charge and discharge of a power storage device of a consumer terminal supplied by the same power distribution network, the consumer terminal comprising:
consumer equipment;
a local power production system;
a power storage device;
the control process comprising a definition step of a charge or discharge command to the power storage device as a function of:
a charge or discharge instruction sent by an overall control system;
the instantaneous power consumed by the consumer equipment, such that the instantaneous power consumed by the consumer equipment is always greater than the discharge power of the power storage device to ensure non-reinjection of the power stored by the power storage device over the power distribution network.

The charge or discharge command is adjusted periodically,
the charge or discharge command at a cycle N+1 being equal to the charge or discharge command at a cycle N, when at cycle N the instantaneous power injected into the network by the consumer terminal, defined as the difference between the discharge power of the power storage device and the instantaneous power consumed by the consumer equipment, was negative or nil;
the charge or discharge command of a cycle N+1 being equal to the charge or discharge command of a cycle N minus the instantaneous power injected into the network by the consumer terminal at cycle N, when at cycle N the instantaneous power injected into the network by the consumer terminal was positive.

The invention also proposes a control process for charge and discharge of a power storage device of a consumer terminal belonging to a plurality of consumer terminals connected to the same power distribution network,
some of the consumer terminals comprising:
consumer equipment;
a local power production system;
a power storage device;
the process also comprising steps of:
definition of a charge or discharge instruction of the power storage device as a function of information received from the different local control systems,
transmission of said instruction to the local control system (6) of said consumer terminal.

DESCRIPTION OF FIGURES

Other aims, characteristics and advantages will emerge from the following detailed description in reference to the appended diagrams given by way of illustration and non-limiting, wherein.

DETAILED DESCRIPTION OF THE INVENTION

Figure 1:
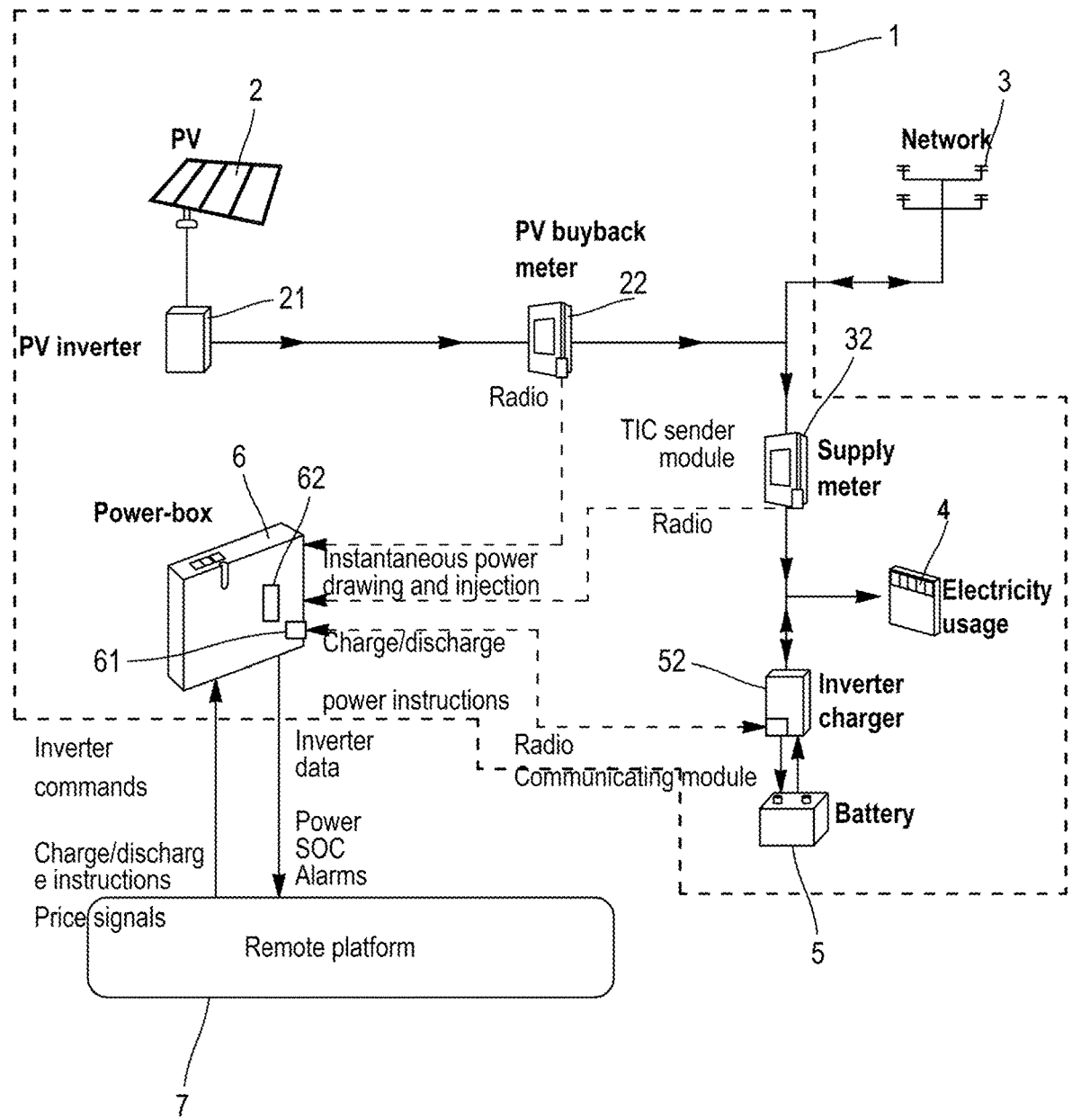
FIG. 1 illustrates a distribution network equipped with an overall control system according to the invention.

FIG. 1 shows an electric power distribution network 3 comprising:
an overall control system 7;
a plurality of consumer terminals 1 connected to the power distribution network 3.

The consumer terminals 1 are typically residences.
Some consumer terminals 1 comprise:
consumer equipment 4, such as household appliances;
a local power production system 2;
a power storage device 5;
a local control system 6 of the power storage device 5.

The local power production system 2 can in particular be a photovoltaic panel or a wind turbine.

The power storage device 5 is a residential battery connected to the electrical network of the residence, whether permanently, is the case of a static battery, or intermittently which is the case of the battery of an electric vehicle.

Each consumer terminal 1 is connected to the power distribution network 3 by a charger/inverter 52.

The charger/inverter 52 ensures both a charging and inverting function and will be called converter hereinbelow.

The converter 52 is a bidirectional direct/alternating current convertion device for connecting the power storage device 5 which is supplied with direct current to the electrical network of the residence supplying alternating current.

The chargers 52 having power instruction which can be modulated by an external command signal must be adapted by manufacturers to each model of static batteries. The batteries of electric vehicles are usually connected to non-inverter chargers, but inverter-chargers adapted to electric vehicles are described for example in document US 2013/0113413 A1.

The consumer terminals 1 comprise a power meter 32 consumed by the terminal 1 accounting for the consumed power by the terminal 1.

The power consumed by the terminal 1 can originate either from the distribution network 3 or the local production system 2.

The instantaneous power consumed by the consumer terminal is the sum of the instantaneous power consumed by the consumer equipment 4 and of the charge or discharge power of the power storage device.

The charge power is positive when the battery is charging and negative when the battery is discharging.

When the power storage system 5 is charging, the power drawn by the power storage system 5 is accounted for directly in the consumed power.

When the power storage system 5 is discharging, the power supplied by the power storage system 5 to electrical appliances of the residence is directly subtracted from the consumed power.

The consumer terminals 1 producing power also comprise a power meter 22 produced by the consumer terminal.

The meters supply the power produced and consumed by the residence in real time (that is, with a measuring cycle of fewer than 10 seconds).

These data are transmitted in real time to the local control system 6 for example via a radio or wired network.

The local control system 6 transmits these data periodically to the overall control system 7, typically once per day.

The local power management system 6 is a micro-computer comprising a micro-processor, a memory, and an input-output interface.

The local power management system receives data from the power meter 32 consumed and/or of the power meter 22 produced by the consumer terminal in real time, as well as control signals from the overall management system 7 via for example the internet link of the residence or its own connection via the mobile telecommunications network.

The local power management system sends to the charger 52 the charge or discharge commands according to the programmes it has prepared for local optimisation of management of the power in the region of the residence or in response to demand of the overall control system 7, while integrating local information.

Each local control system 6 comprises a sender 61 configured to communicate with the power meters 32 and 22 and with the converter 52.

Each local control system 6 also comprises a sender 62 configured to communicate with the overall control system 7.

Communication can be performed via radio, by Power-Line-Carrier (PLC) or a by a dedicated wired network.

The charger 52 receives the charge or discharge commands of the power storage device 5 sent by the local control system 6 for example via a radio or wired network.

The charger 52 sends information necessary for local or remote optimisation of power back to the local control system 6.

This information comprises at least:
the charge status of the power storage device 5,
the real-time power consumed by the terminal 1,
the real-time power produced by the local power production system 2.

This information can also comprise:
measuring the charge and discharge power of the battery;
a state of health of the power storage device 5,
alarms.

The local control systems 6 also comprise a user interface configured to display information comprising at least the level of charge of the storage device.

In addition to local optimisation of the power of the residence, the overall control system 7 optimises management of the power of a set of residences.

For at least one of the consumer terminals 1, the overall control system 7 is configured to define a charge or discharge instruction of the power storage device 5, as a function of information received from the different local control systems 6, and to transmit said instruction to the local control system 6 of said consumer terminal 1.

The charge or discharge instruction defined by the overall control system 7 is defined for each consumer terminal 1 such that the response of the set of consumer terminals 1 is an overall optimum for management of the network.

The charge or discharge instruction defined by the overall control system 7 especially considers a rise or fall in cumulative consumptions linked to charge or discharge of local storage systems 5.

The overall control system 7 is configured to define the charge or discharge instructions especially with the aim of rebalancing the production and consumption of an area, or to reduce a national consumption point.

Figure 2:
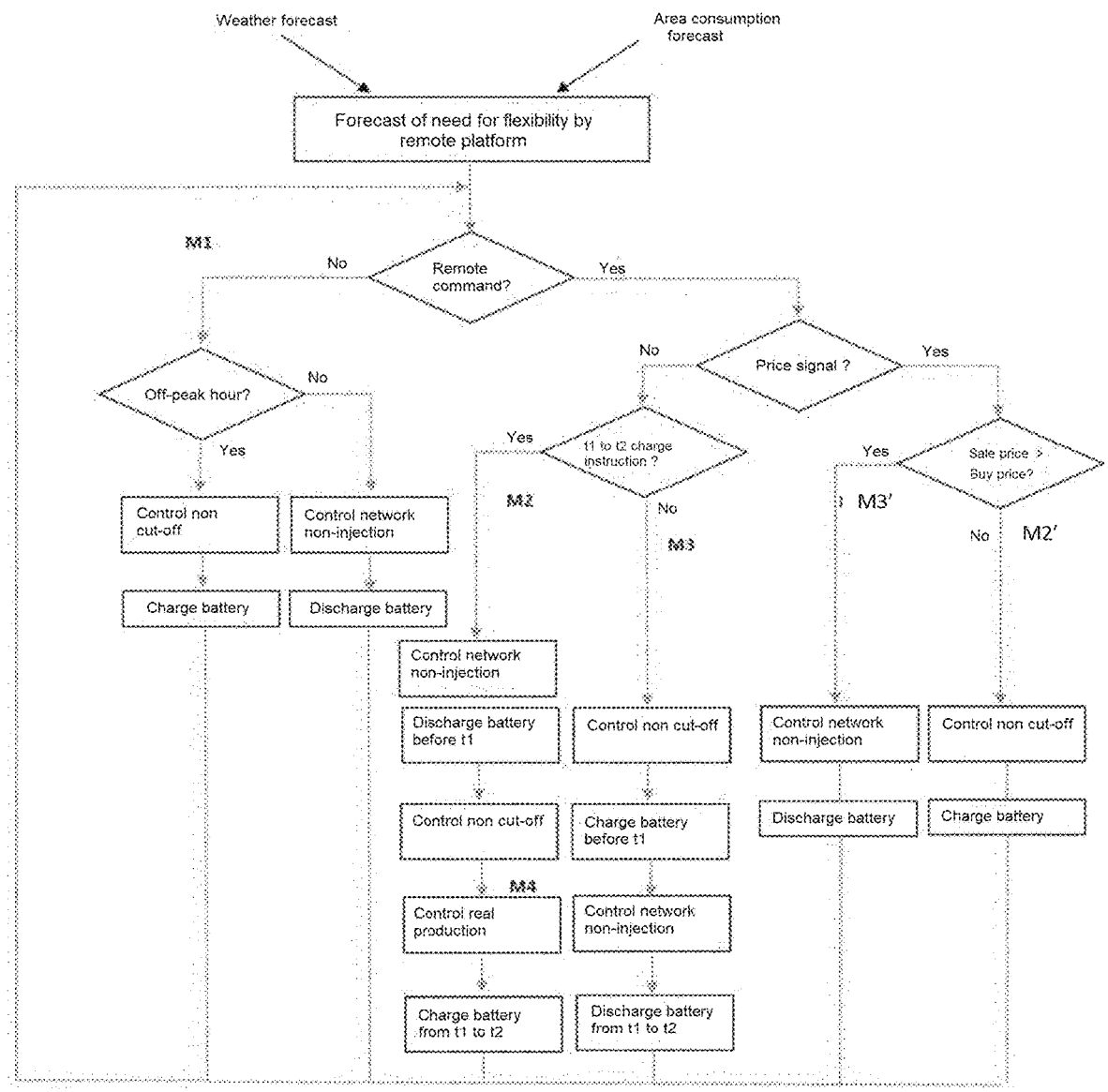
FIG. 2 illustrates an overall control process according to the invention.

As illustrated by the box M2' and M3' in FIG. 2, the overall control system 7 can transmit to the different local control systems 6 information on dynamic price of the power (bought or sold over the network) which the local algorithm will integrate into its optimisation calculation.

In the case of a consumer terminal comprising a local power production device 2, the local control system 6 can consider the instantaneous power produced provided by the production meter 22 for calculating the net power injected by the consumer terminal over the network defined as the difference between production of the consumer terminal and consumption of the consumer terminal.

The charge or discharge command of local control systems 6 is defined to modulate the net power injected into the network for different optimisation aims: maximisation of autoconsumption, limitation of injection over the network, or optimisation of consumption invoices and sale of power as a function of market price.

As illustrated by the box M1 in FIG. 2, the charge or discharge command of local control systems can especially be defined to minimise the cost of power supplied by the electricity network.

In the present case, the command of the local control system 6 is a charge command at so-called "off-peak" hours during which the power collected at the public distribution network is invoice at the lowest price to store power in the battery during off-peak hours. The command of the local control system 6 is a discharge command at so-called 'peak' hours during which the power collected at the public distribution network is invoiced at the highest price, to feed the household appliances of the residence.

The pricing schedule of peak and off-peak hours can be information sent by the overall control system 7. The pricing schedule can also be pre-programmed in the local control system 6 in the event where the latter is not communicating with the overall control system 7.

Typically pricing schedules show daily cycles of variation in power price. The default mode of the control of batteries therefore corresponds to a daily cycle of charge/discharge of batteries.

In addition to local control, on some special days the overall control system 7 optimises management of the power of a set of terminals. In this case a control mode of special days (Management mode of production surpluses and Management mode of the point of consumption) is substituted for the default mode described earlier.

The overall control system 7 sends to the local control system 6 information which triggers exit from the default mode.

This information can especially be:
- a signal of dynamic price of power, valid over a specific time interval which the local algorithm will integrate in its optimisation calculation of charge and discharge periods. This information would be for example, 'tomorrow from 18 h to 20 h power sera supplied at the super peak rate of xx €/kWh';
- a charge or discharge instruction specific to the terminal and over a given time interval so that the response of the set of terminals, that is, the rise or fall in cumulative consumption caused by charging or discharging of individual batteries, produces the overall preferred optimum for management of the network (typically with the aim of rebalancing production and consumption in an area, or to reduce a national consumption point). This information would be for example, 'tomorrow instruction to charge the battery from 13 h to 15 h' (for example to absorb production surpluses of the area forecast by the remote platform).

In the present case, the local control system 6 sends the overall control system 7 information necessary for calculating the overall optimum (charge status of batteries, histories of charge or discharge curves) and information enabling monitoring of proper operation of individual systems (state of health of the battery, temperature alarms, disconnection . . . ).

As illustrated by the box M2 in FIG. 2, the overall control system can be configured to store production surpluses on some sections of network (typically to limit localised rises in voltage and avoid reinforcement of the network or automatic shutdown of production means in case of overvoltage).

Production surpluses are forecast by the overall control system 7 as a function of the weather (wind and sun) and consumptions forecasts (as a function of the week/week-end day, temperature, history of past consumption).

When a production surplus is forecast, the overall control system 7 sends to the local control systems 6 a charge instruction (which can also be a signal for reduced price of power causing charge of power) during the relevant period, determined by the local optimisation algorithm of the local control system 6. The instruction is sent with sufficient notice (from 24 h to a few hours) to allow discharge of the battery before the expected charge period.

As illustrated by the box M3 in FIG. 2, the overall control system can also be configured to reduce the consumption of a set of residences to limit power transits over the network (to avoid surcharges on lines or transformers), or to limit the use of generally expensive and more polluting production point means).

The consumption points are forecast by the remote platform as a function of weather (temperature, wind) and consumption forecasts (as a function of the week/week-end day, temperature, history of past consumption).

When a consumption point is forecast, the overall control system 7 sends the local control systems 6 a discharge instruction, (which can also be a signal for reduced price of power causing discharge of power) during the relevant period, determined by the local optimisation algorithm of the local control system 6. The discharge instruction is sent with sufficient notice (from 24 h to a few hours) to allow charging of the battery before the expected discharge period.

The charge and the discharge of the battery are controlled continuously by the local control system 6, independently of the type of control and mode of use.

The local control system 6 determines the charge or discharge instruction to not cause disconnection of the residence during the charge phase of the battery.

For this the local control system 6 defines the charge instruction as a function of the instantaneous power consumed by the residence, so that the cumulation of power absorbed by household appliances and the charge power of the battery remains less than the subscribed power of the residence, which is the contractual power beyond which the main circuit-breaker opens and cuts the network feed.

Also, the local control system 6 determines the charge or discharge command such that the net power injected into the network is negative or nil.

In fact, the power reinjected into the network is not counted by the consumption meter 32 and cannot be remunerated as would solar production.

The power stored in the battery ne can therefore serve only to power household appliances of the residence.

For this purpose, the charge or discharge command is defined such that the instantaneous power consumed by the consumer equipment 4 is always greater than the discharge power of the power storage device 5, to ensure non-reinjection of the power stored by the power storage device 5 over the power distribution network 3.

The charge or discharge command is adjusted periodically, over cycles typically lasting between 1 s and 60 s,
- the charge or discharge command at a cycle N+1 being equal to the charge or discharge command at n cycle N, when at cycle N, the instantaneous power injected into the network by the consumer terminal, defined as the difference between the discharge power of the power storage device 5 and the instantaneous power consumed by the consumer equipment 4, was negative or nil;
- the charge or discharge command of a cycle N+1 being equal to the charge or discharge command of a cycle N minus the instantaneous power injected into the network by the consumer terminal at cycle N, when at cycle N the instantaneous power injected into the network by the consumer terminal, was positive.

The local control system 6 considers the value delivered by the production meter 22 representative of the instantaneous power produced by the local production system 2 and that delivered by the consumed power meter 32 representative of the consumed power by the terminal 1, to determine the net power injected over the network, the net power injected into the network being defined as the instantaneous power produced by the local production system 2 from which is the consumed power is subtracted by the terminal 1.

The local control system 6 defines the charge command as a function of the instantaneous power consumed by the residence, so that the latter at all times remains less than the power consumed by the terminal since hereafter the discharged power is reinjected into the network and lost for the client.

The invention claimed is:

1. A local control system of a charge and of a discharge of a power storage device of a consumer terminal supplied by a power distribution network, the consumer terminal comprising:
   a consumer equipment;
   a local power production system; and
   the power storage device;
   the local control system comprising:
   a sender configured to collect information comprising at least the charge status of the power storage device, and an instantaneous power consumed by the consumer equipment;
   the sender configured to receive from an overall control system a charge or discharge instruction of the power storage device ;
   the local control system being configured to define a charge or discharge command to the power storage device as a function of:
   the charge or discharge instruction sent by the overall control system; and
   the instantaneous power consumed by the consumer equipment,
   such that the instantaneous power consumed by the consumer equipment is always greater than the discharge power of the power storage device, to ensure non-reinjection of the power stored by the power storage device over the power distribution network.

2. The local control system, according to claim 1, wherein the charge or discharge command is adjusted periodically,
   the charge or discharge command at a cycle N+1 being equal to the charge or discharge command at a cycle N, when at cycle N the instantaneous power injected into the network by the consumer terminal, defined as the difference between the discharge power of the power storage device (5) and the instantaneous power consumed by the consumer equipment, was negative or nil;
   the charge or discharge command of a cycle N+1 being equal to the charge or discharge command of a cycle N minus the instantaneous power injected into the network by the consumer terminal at cycle N, when at cycle N the instantaneous power injected into the network by the consumer terminal was positive.

3. The local control system, according to claim 2, wherein the charge or discharge command to the power storage device is defined such that the instantaneous power produced by the local power production system is always less than or equal to the sum of the instantaneous power consumed by the consumer equipment and of the charge or discharge power of the power storage device, to ensure non-reinjection of power over the power distribution network.

4. The local control system, according to claim 1, wherein the charge or discharge command to the power storage device is defined such that the sum of the instantaneous power consumed by the consumer equipment and of the charge or discharge power of the power storage device is always less than or equal to a value of maximum contractual power.

5. The local control system according to claim 1, also comprising a user interface configured to display information comprising at least the level of charge of the storage device.

6. The local control system according to claim 1, also comprising a power meter consumed by the consumer terminal.

7. The local control system according to claim 1, also comprising a power meter produced by the local power production system.

8. The local control system according to claim 1, wherein the charge or discharge instruction sent by the overall control system is a function of a sunlight forecast.

9. The local control system according to claim 1, the charge or discharge instruction sent by the overall control system being a function of forecast of overall consumption of the set of consumer terminals.

10. The local control system of claim 1, wherein the power storage device is a residential battery connected intermittently with the local power production system.

11. The local control system of claim 1, wherein the power storage device is a battery of an electric vehicle.

12. The local control system of claim 1, wherein the sender and the overall control system is connected using radio, Power-Line-Carrier (PLC) or a by a dedicated wired network.

13. The local control system of claim 1, wherein the overall control system is configured to:
   forecast a production surplus as a function of the weather and consumptions forecasts;
   send to the local control systems a discharge instruction to the power storage device before the production surplus.

14. The local control system of claim 1, wherein the instantaneous power consumed is measured in a cycle of fewer than 10 seconds.

15. An overall control system of a charge and of a discharge of a plurality of power storage devices of consumer terminals supplied by a power distribution network, at least one of the plurality of consumer terminals comprising:
   a local power production system;
   a power storage device;
   a local control system of the charge and of the discharge of the power storage device including a sender configured to collect information comprising at least the charge status of the power storage device and an instantaneous power consumed by the consumer equipment, the local control system being configured to define a charge or discharge command to the power storage device as a function of:
   the charge or discharge instruction sent by the overall control system; and
   the instantaneous power consumed by the consumer equipment,
   such that the instantaneous power consumed by the consumer equipment is always greater than the discharge power of the power storage device, to ensure non-reinjection of the power stored by the power storage device over the power distribution network;
   the overall control system being configured to:
   define, as a function of the information received from the different local control systems, a charge or discharge instruction to at least one local control system; and transmit the charge or discharge instruction to the local control system.

16. The overall control system of claim 15, wherein the instantaneous power consumed is measured in a cycle of fewer than 10 seconds.

17. A control process of a charge and of a discharge of a power storage device of a consumer terminal supplied by a power distribution network, the consumer terminal comprising:
- a consumer equipment;
- a local power production system;
- the power storage device;
- the control process comprising a definition step of a charge or discharge command to the power storage device as a function of:
  - a charge or discharge instruction sent by an overall control system;
  - an instantaneous power consumed by the consumer equipment,
  - such that the instantaneous power consumed by the consumer equipment is always greater than the discharge power of the power storage device to ensure non-reinjection of the power stored by the power storage device over the power distribution network.

18. The control process according to claim 17, wherein the charge or discharge command is adjusted periodically,
the charge or discharge command at a cycle N+1 being equal to the charge or discharge command at a cycle N, when at cycle N, the instantaneous power injected into the network by the consumer terminal, defined as the difference between the discharge power of the power storage device and the instantaneous power consumed by the consumer equipment, was negative or nil;
the charge or discharge command of a cycle N+1 being equal to the charge or discharge command of a cycle N minus the instantaneous power injected into the network by the consumer terminal at cycle N, when at cycle N the instantaneous power injected into the network by the consumer terminal was positive.

19. The control process of the charge and of the discharge of the power storage device of the consumer terminal belonging to a plurality of consumer terminals connected to the power distribution network according to claim 17, wherein at least one of the plurality of consumer terminals includes:
- the consumer equipment;
- the local power production system;
- the power storage device; and
- the process further comprising steps of:
  - defining a charge or discharge instruction of the power storage device as a function of information received from the different local control systems, and
  - transmitting the charge or discharge instruction to the local control system of said consumer terminal.

20. The control process of claim 17, wherein the instantaneous power consumed is measured in a cycle of fewer than 10 seconds.

* * * * *